Figure 1:
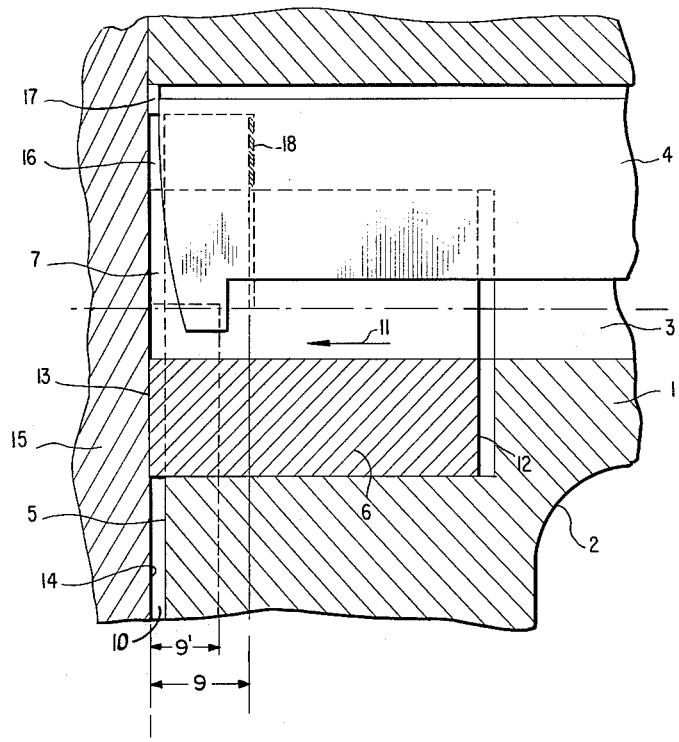

INVENTORS
WILLI SPRINGER
HEINZ LAMM
BY Dicke & Craig
ATTORNEYS

Jan. 18, 1966   W. SPRINGER ETAL   3,229,899
ROTARY-PISTON ENGINE

Filed March 19, 1963   2 Sheets-Sheet 2

INVENTORS.
WILLI SPRINGER
HEINZ LAMM

BY *Dicke & Craig*

ATTORNEYS

United States Patent Office 3,229,899
Patented Jan. 18, 1966

3,229,899
ROTARY-PISTON ENGINE
Willi Springer, Faurndau, and Heinz Lamm, Stuttgart-Bad Cannstatt, Germany, assignors to Daimler-Benz Aktiengesellschaft, Stuttgart-Unterturkheim, Germany
Filed Mar. 19, 1963, Ser. No. 266,291
Claims priority, application Germany, Mar. 21, 1962, D 38,428
10 Claims. (Cl. 230—145)

The present invention relates to a rotary-piston engine, and more particularly to a radial seal construction at the corners of pistons in rotary-piston engines, especially rotary-piston internal combustion engines of trochoidal construction, having a sealing vane member arranged within a groove in the piston extending parallelly to the axis thereof, and sealing bolt members operable to engage sealingly against the side walls of the side parts of the housing whereby the sealing bolt members are inserted, slidable in the axial direction, to both sides of the piston into the end walls of the piston within the area of the lower parts of the grooves extending parallelly to the piston axis and against which abut the arcuately-shaped sealing strip members of the external axial seals.

The present invention aims at an improvement of the sealing conditions produced by the known prior art sealing bolt members, especially as regards the lateral tightness at radial sealing vane members made in one piece which have to be installed with sufficient lateral play by reason of the changing temperature conditions.

The present invention essentially consists in sealing bolt members which are provided with end walls at the outer parts thereof directed against the housing side walls which end walls extend at least to the piston flanks. The thickness of the end walls at the sealing bolt members may be greater than the depth of the grooves for the arcuately-shaped sealing strip members in the end walls of the piston. With the arrangement of the prior art sealing bolt members at the corners of a piston, gases which are under pressure are able to leak or seep within the area between the upper boundary of the sealing bolt member and the walls of the enclosure body, on the one hand, and the side walls of the side part of the housing and the lateral edge of the sealing vane member or, depending on the lateral play, also of the end surface of the piston, on the other. By the construction of the sealing bolt member in accordance with the present invention this gap is closed except for a slight residual radial height; for the sealing bolt member abuts in sealing relationship against the side wall up to the upper piston corner. The slight residual dimension in height, however, can be further reduced if according to a further feature of the present invention, the side walls of the sealing bolt members are extended beyond the piston flanks.

Accordingly, it is an object of the present invention to provide a radial seal for pistons in rotary-piston engines, particularly rotary-piston internal combustion engines which obviates the shortcomings encountered with the prior art constructions and improves the sealing conditions particularly along the sides of the radial seals.

Another object of the present invention resides in the provision of a radial seal construction for rotary-piston engines in which the sealing bolt member is so constructed and arranged as to minimize gas leakages in the spaces at the lateral surfaces of the sealing vane members.

Still a further object of the present invention resides in the provision of a radial seal arrangement for rotary-piston engines, especially rotary-piston internal combustion engines in which the danger of gas leakages through the lateral plays, necessitated between the sealing vane members and the lateral housing walls by the changing temperature conditions, are effectively minimized.

A further object of the present invention resides in the provision of a radial seal for rotary-piston engines which may be manufactured in a simple and relatively inexpensive manner, is reliable in operation and also permits of facilitated manufacture and machining of other piston seals.

Another object of the present invention resides in the provision of a radial seal construction for the pistons of rotary-piston engines which includes sealing vane members and sealing bolt members and which is so constructed as to effectively prevent any jamming or wedging effect by the sealing bolt members on the sealing vane members.

Figure 2:
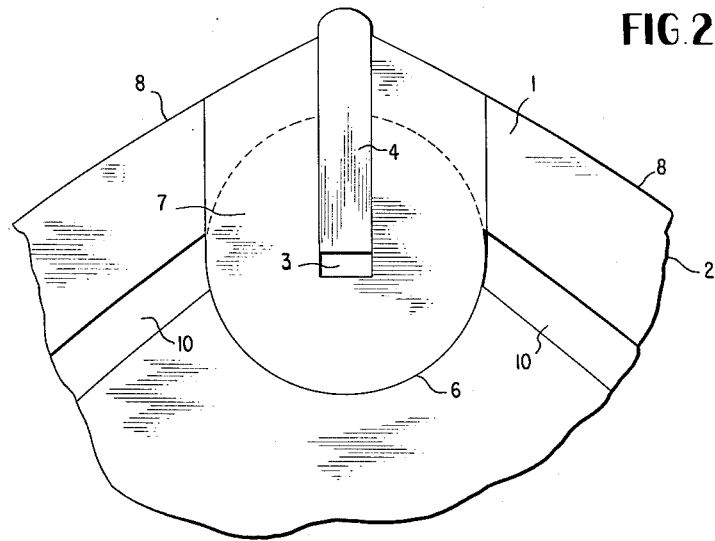
Figure 3:
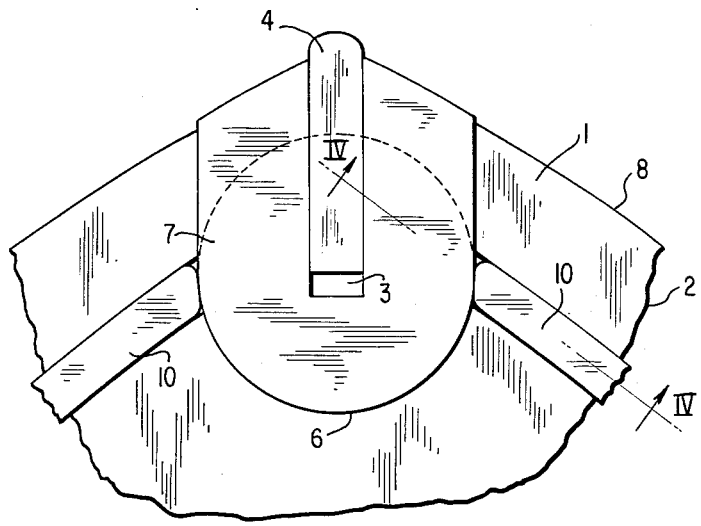
Figure 4:
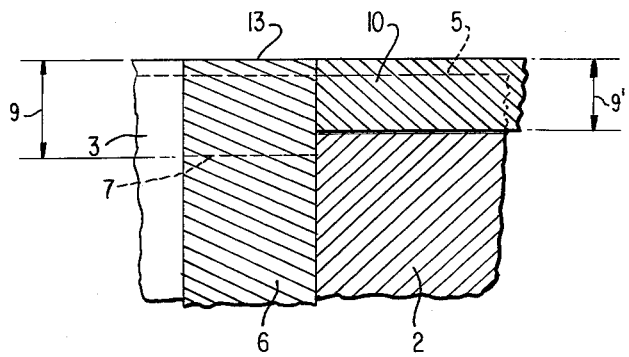

These and other objects, features and advantages of the present invention will become more obvious from the following description when taken in connection with the accompanying drawing which shows, for purposes of illustration only, one embodiment in accordance with the present invention, and wherein:

FIGURE 1 is a partial axial cross sectional view through a piston corner provided with a radial seal construction in accordance with the present invention, FIGURE 2 is a partial elevational view of the piston corner of FIGURE 1, FIGURE 3 is a partial elevational view of the piston corner provided with a modified radial seal construction in accordance with the present invention, and FIGURE 4 is a partial cross sectional view taken along line IV—IV of FIGURE 3.

Referring now to the drawing wherein like reference numerals are used throughout the two views to designate like parts, reference numeral 1 designates the corner of the piston 2 which is adapted to rotate within the enclosure body constituted by the engine housing. The piston 2 is provided at each corner with a groove 3 extending parallelly to the axis thereof for accommodating therein a sealing vane member 4 movably supported in the radial direction by elastic means (not shown) of any conventional known construction. A sealing bolt member 6 is inserted into a corresponding aperture within the area of the lower part of the groove 3 within each end wall 5 of the piston in such a manner that movements of the sealing bolt member 6 are possible in the axial direction thereof. The sealing bolt member 6 is also provided with a groove corresponding to and in substantial alignment with the groove 3. The sealing bolt member 6 is provided at the outer part thereof facing the side wall 14 of the side part 15 of the engine housing with a lateral end wall 7 which is extended in the radial direction at least to the flanks 8 of the piston. A groove corresponding to groove 3 is also provided in this end wall 7. The dimension 9 of the end wall 7 in the axial direction is larger than the depth 9' (FIGURE 4) of the grooves for the arcuately-shaped sealing strip members 10 of the external axial seal of the piston.

With a displacement of the sealing bolt member 6 in the direction of arrow 11 by reason of the gas pressure on the surface 12 of the sealing bolt member 6, the latter is brought with the surface 13 of its end wall 7 into contact with the side walls 14 of the side part 15 of the engine housing from the lower boundary to the upper boundary at the piston flanks so that a good seal is assured and the gap 16 which would be present with the use of a sealing bolt member without the extended end wall 7, actually disappears. Only the residual gap 17 remains. The gap 18 is closed off by the sealing vane member 4. The upwardly extended end wall 7 furthermore enables a facilitated machining of the grooves for the arcuately-shaped sealing strip members 10 since the work tool may run out freely. Additionally, the end wall 7 makes it possible to arrange still further sealing strip members, if necessary, in parallel to the sealing strip members 10. In contrast to a merely circular sealing bolt member, the sealing bolt member 6 according to the present invention also is unable to rotate so that any wedging or jamming feedback effect on the sealing ledge member 4 is eliminated.

Furthermore, it is also possible to extend the end wall 7 within the area of the radial piston play beyond the flanks 8 of the piston so that the residual gap 17 is still further reduced. Such an arrangement is illustrated in FIGURES 3 and 4 in which the end wall 7 extends beyond the piston flanks 8.

While we have shown and described one embodiment in accordance with the present invention, it is understood that the same is not limited thereto but is susceptible of numerous changes and modfications within the spirit and scope thereof, and we therefore do not wish to be limited to the details shown and described herein but intend to cover all such changes and modifications as are encompassed by the scope of the appended claims.

We claim:

1. A radial seal arrangement for the corners of pistons in rotary-piston engines, particularly rotary-piston internal combustion engines of trochoidal construction, including an engine housing provided with circumferential internal housing surfaces, comprising:

piston means provided with groove means, and seal means for said piston means including, within a respective groove means, sealing vane means operable to engage, by radially outward movements thereof against the circumferential internal surfaces of the engine housing and sealing bolt means operable to provide a seal against the side walls of the housing, said sealing bolt means being inserted into recesses disposed radially inwardly of and surrounded by the end surfaces of the piston constituted by the piston flanks on both sides of the piston means within the area of the lower portion of the groove means so as to be slidable only in the axial direction, said sealing bolt means being provided at the outer parts facing the housing side walls with end walls disposed on both sides of the sealing vane means and extending at least approximately to the piston flanks of the piston means to thereby seal the gap produced between the axial end faces of the piston means and opposite housing walls, produced by the radially inward spacing of the recesses accommodating the sealing bolt means.

2. A radial seal arrangement for the corners of pistons in rotary-piston engines, particularly rotary-piston internal combustion engines of trochoidal construction, including an engine housing provided with circumferential internal housing surfaces, comprising:

piston means provided with groove means, and seal means for said piston means including, within a respective groove means, sealing vane means operable to engage, by radially outward movements thereof against the circumferential internal surfaces of the engine housing and sealing bolt means operable to provide a seal against the side walls of the housing, said sealing bolt means being inserted into recesses disposed radially inwardly of and surrounded by the piston end surfaces constituted by the piston flanks on both sides of the piston means within the area of the lower portion of the groove means so as to be slidable only in the axial direction, and arcuately-shaped sealing strip means forming the external axial seal of the piston means and abutting directly against the side walls of said housing and against said sealing bolt means, said sealing bolt means being provided at the outer parts facing the housing side walls with end walls extending at least approximately to the piston flanks of the piston means to thereby seal the gap between the axial end faces of the piston means and opposite housing walls, produced by the radially inward spacing of the recesses accommodating the sealing bolt means, the thickness of said end walls at the sealing bolt means being larger than the depth of the grooves accommodating the arcuately-shaped sealing strip means in the lateral end walls of the piston means.

3. A radial seal arrangement for the corners of pistons in rotary-piston engines, particularly rotary-piston internal combustion engines of trochoidal construction, including an engine housing provided with circumferential internal housing surfaces, comprising:

piston means provided with groove means, and seal means for said piston means including, within a respective groove means, sealing vane means operable to engage, by radially outward movements thereof against the circumferential internal surfaces of the engine housing and sealing bolt means operable to provide a seal against the side walls of the housing, said sealing bolt means being inserted into recesses disposed radially inwardly of and closed off radially outwardly thereof by the piston end surfaces constituted by the piston flanks on both sides of the piston means within the area of the lower portion of the groove means so as to be slidable only in the axial direction, and arcuately-shaped sealing strip means forming the external axial seal of the piston means and abutting directly against the side walls of said housing and against said sealing bolt means, said sealing bolt means being provided at the outer parts facing thhe housing side walls with end walls extending at least approximately to the piston flanks of the piston means to thereby seal the gap produced between the axial end faces of the piston means at opposite housing walls, produced by the radially inward spacing of the recesses accommodating the sealing bolt means, the thickness of said end walls at the sealing bolt means being larger than the depth of the grooves accommodating the arcuately-shaped sealing strip means in the lateral end walls of the piston means, and the end walls of the sealing bolt means extending beyond the piston flanks in the radially outward direction.

4. In a rotary-piston engine, particularly in a rotary-piston internal combustion engine of trochoidal construction, provided with an engine housing having internal surfaces at the housing walls thereof and a piston rotatable within said housing and provided at the piston corners thereof with grooves extending substantially parallelly to the piston axis and accommodating therein radial seals which include at least one radial sealing vane member and sealing bolt members inserted in an axially slidable manner within recesses disposed radially inwardly of the piston corner, surroundd on all sides thereof by the piston and located within the area of the lower portion of a respective groove to provide a seal against the housing side walls, the improvement essentially consisting of providing each sealing bolt member at the part thereof facing the housing side wall with end walls integral with the bolt member that extend radially outwardly at least up to the piston flank so as to substantially seal the gap between the end faces of the piston disposed radially outwardly of the recesses and opposite housing walls.

5. In a rotary-piston engine, particularly in a rotary-piston internal combustion engine of trochoidal construction, provided with an engine housing having internal surfaces at the housing walls thereof and a piston rotatable within said housing and provided at the piston corners thereof with grooves extending substantially parallelly to the piston axis and accommodating therein radial seals which include at least one radial sealing vane member and sealing bolt members inserted in an axially slidable manner within recesses disposed radially inwardly of the piston corner, surrounded on all sides thereof by the piston and located within the area of the lower portion of a respective groove to provide a seal against the housing side walls, the improvement essentially consisting of providing each sealing bolt member at the part thereof facing the housing side wall with end walls integral with said bolt member that extend radially outwardly beyond the piston flank so as to substantially seal the gaps between the end faces of the piston end faces disposed radially outwardly of said recesses and the opposite housing walls.

6. A radial seal arrangement for the corners of pistons in rotary-piston engines, particularly rotary-piston internal combustion engines of trochoidal construction, having an engine housing including housing side walls and provided with circumferential internal housing surfaces, comprising:

polygonal piston means provided with axially extending grooves at the piston corners thereof, and seal means for sealing the piston means with respect to the housing side walls as well as the circumferential internal housing surfaces including, within a respective groove, sealing vane means operable to engage, by radially outward movements thereof against the circumferential internal surfaces of the engine housing, sealing bolt means arranged along the end faces and operable to provide a seal with respect to the side walls of the housing, and arcuately-shaped sealing strip means inserted within arcuately shaped gooves provided in the end faces of the piston means to provide a direct seal with respect to the side walls of the housing, said sealing strip means terminating directly at said sealing bolt means, each bolt means including a main bolt portion of predetermined configuration, end wall portions rigid with and extending radially outwardly beyond the cross sectional area of a respective main portion whereby said end wall portions have larger axial end surfaces than the cross sectional areas of the main portions, said main end wall portions being provided with apertures complementary to the grooves to accommodate said sealing vane means, said piston means being provided with recesses within the end faces thereof spaced radially inwardly of a respective piston corner and of such shape and dimension as to enable sliding movement of said bolt means only in the axial direction, and said end wall portions extending radially outwardly from said main portion at least up to the piston flanks of the piston means to substantially bridge the area of the end faces of the piston means corresponding to the inward spacing of said recesses.

7. A radial seal arrangement according to claim 6, wherein the end wall portions extend beyond the piston flanks.

8. A radial seal arrangement according to claim 6, wherein the arcuately shaped grooves are of lesser depth than the thickness of the end wall portions.

9. A radial seal arrangement according to claim 6, wherein said end wall portions extend radially outwardly only within the circumferential dimensions of the main portion.

10. A radial seal arrangement according to claim 9, wherein the end wall portions extend radially outwardly substantially only within the circumferential dimensions of the main portion, and wherein said arcuately shaped grooves are of smaller depth than the thickness of said end wall and end wall portions.

References Cited by the Examiner

UNITED STATES PATENTS

| | | | |
|---|---|---|---|
| 2,722,201 | 11/1955 | Muse | 123—8 |
| 3,064,880 | 11/1962 | Wankel et al. | 123—8 |
| 3,102,520 | 9/1963 | Schlor | 123—8 |

FOREIGN PATENTS 221,057    9/1924    Great Britain.

OTHER REFERENCES

Benz, German application, 1,115,267, printed Oct. 19, 1961.

DONLEY J. STOCKING, *Primary Examiner.*

JOSEPH H. BRANSON, JR., KARL J. ALBRECHT, *Examiners.*